April 22, 1930.                    M. F. CARR                    1,755,591
                               SEPARABLE FASTENER
                              Filed Feb. 2, 1928
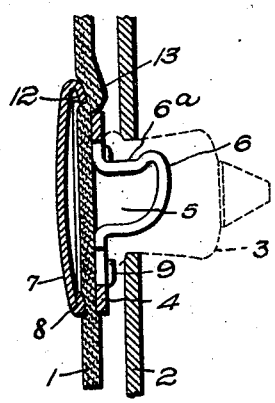
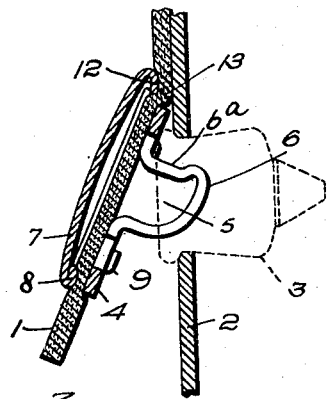
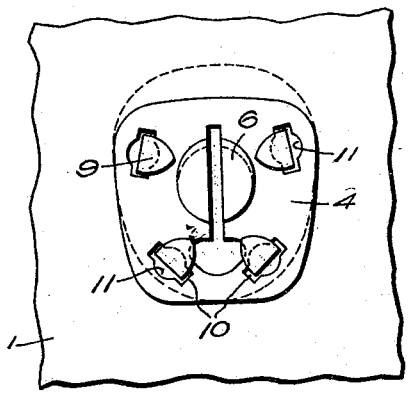
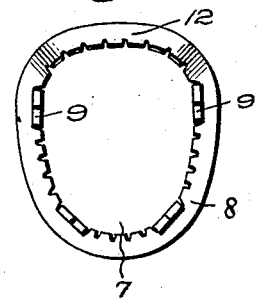
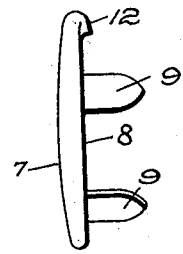
Inventor:
Moses F. Carr
by Emery, Booth, Janney & Varney
Attys Patented Apr. 22, 1930

1,755,591

UNITED STATES PATENT OFFICE

MOSES F. CARR, OF LEXINGTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

SEPARABLE FASTENER

Application filed February 2, 1928. Serial No. 251,324.

My invention aims to provide improvements in separable fasteners, particularly of the flush-type.

In the drawings, which illustrate a preferred embodiment of my invention:—

Figure 1 is a vertical section showing the complete stud assembly, a socket support and a socket, shown in dotted lines, and showing the relative positions of the stud support and the socket support when the stud and socket are joined;

Fig. 2 is a section similar to that shown in Fig. 1, except that the stud installation is shown as being tipped out of engagement with the socket, the stud support being shown engaged with the socket support to prevent engagement of the inner plate of the stud assembly with the socket support;

Fig. 3 is an elevation of the stud assembly;

Fig. 4 is an elevation of the attaching plate as viewed from the inner face thereof; and Fig. 5 is a side elevation of the attaching plate.

Referring to the embodiment of my invention, illustrated by the accompanying drawings, I have shown a flush-type fastener installation of the type wherein one of the fastener elements is secured to a flexible carrying medium or curtain and the cooperating fastener element is secured to a rigid support. The fastener installation which includes the curtain is provided with a plate at the front face of the curtain and a second plate at the inner face of the curtain.

Heretofore, in constructing fasteners of the flush type, it was the usual practice to have the inner plate cover substantially the same area of the curtain as the front plate. Therefore, when the fastener stud was tipped to separate it from the socket, the inner plate would touch the support for the socket and leave an unsightly mark upon the surface.

In my new installation it is impossible to mar the surface of the socket support, because the inner plate is cut short at one side so as to leave a portion of the curtain back-supported by the front plate. This back-supported portion of the curtain engages the socket support when the stud is tipped to disengage it from the socket. As the curtain is of soft, flexible material, it cannot injure the surface of the socket support.

For the purposes of illustration only, I have illustrated, in Figs. 1 through 3, what may be assumed to be a portion of a vehicle curtain 1 which is secured to the sheet metal portion 2 of the body of a vehicle. Any type of flush-type fastening elements may be used, but I have shown a three-side lock flush-type fastening for simplicity in describing and illustrating my invention.

In this instance, I have shown a socket 3, in dotted outline, as it would appear when secured to the sheet metal portion 2.

The stud is simple in construction and has a base plate portion 4 resting against the inner face of the curtain 1. A shank portion 5 extends outwardly from the base 4 and has a head 6 and a neck 6ª for cooperative three-side locking engagement with the socket 3, as shown in Fig. 1. At the front face of the curtain 1, I have provided (Figs. 1 and 2) an attaching plate 7. The plates 4 and 7 may be secured to the curtain 1 by attaching prongs presented by one plate and passing through the curtain and engaging the other plate.

In the embodiment of my invention illustrated the attaching plate 7 (Figs. 4 and 5) is provided at its under side adjacent its periphery with an inturned flange 8, and a number of attaching prongs 9. The prongs 9 pass through the curtain 1, through notched openings 10 in the base portion 4 (Fig. 3) and are clenched against the face of the plate 4. The prongs 9 are pointed and the notches 11 at the sides of the apertures 10 in the plate 4 (Fig. 3) cooperate with the pointed ends of the prongs to assist in guiding them into the openings 10 during the attachment of the fastener parts to the curtain 1.

At the upper end of the attaching plate 7, as viewed in the drawings, a portion of the flange 8 is pressed out of its general plane to provide an abutment or boss 12. This boss portion 12 is located laterally beyond the upper edge of the base plate portion 4 and, therefore, may press a portion of the curtain 1 out of its normal plane (Figs. 1 and 2)

to provide a bulge 13 beyond the upper edge of the plate 4.

The bulge 13 is back-supported by the abutment or boss 12, so that, when the curtain is pulled outwardly at its lower edge to tip the stud out of engagement with the socket, it will engage the sheet metal portion 2, as shown in Fig. 2. Thus, the plate portion 4 is kept from contact with the face of the body of the vehicle so that it cannot scratch or mar the painted surface.

While I have shown and described a preferred embodiment of my invention, I do not wish to limit the scope of my invention thereto as I am aware that my invention may be embodied in other specific forms, therefore, reference is made to the following claims to indicate the scope of my invention.

I claim:

1. A separable snap fastener installation comprising, in combination, a fastener element secured to a rigid supporting structure, a cooperating fastener element secured to a flexible carrying medium, plate portions secured to both sides of the carrying medium, and an abutment portion provided by a lateral extension of the plate portion at the outer face of the carrying medium at one side only beyond the outer periphery of the plate portion at the inner face of the carrying medium, said abutment portion being adapted to back-support the carrying medium extending beyond the outer periphery of said plate portion at the inner face of the carrying medium to provide for contact of the carrying medium only with the rigid supporting structure when said fastener elements are tipped relative to each other during separation.

2. A separable snap fastener installation comprising, in combination, a fastener element secured to a rigid supporting structure, a cooperating fastener element secured to a flexible carrying medium, plate portions secured to both sides of the carrying medium, and an abutment portion provided by a boss on an extension of the plate portion at the outer face of the carrying medium at one side only beyond the outer periphery of the plate portion, at the inner face of the carrying medium, said boss pressing a portion only of the carrying medium beyond the plane of said plate portion at the inner face of the carrying medium to provide for contact of the carrying medium only with the rigid supporting structure when said fastener elements are tipped relative to each other during separation.

3. In a three-side lock fastener stud assembly, a stud, a plate portion having a boss portion adjacent to the periphery of and extending only part way around the plate portion thereby pressing a portion only of a flexible carrying medium toward a support for a cooperating socket to provide for contact of the flexible carrying medium with said socket support when the stud is tipped to disengage it from a socket.

4. In a three-side lock fastener stud assembly, a stud, a plate located at the inner face of a flexible carrying medium, and a plate at the outer face of the carrying medium having an inturned flange bearing against the carrying medium and a boss portion formed from said flange and extending only part way around said flange, said boss portion pressing a portion of the carrying medium over the edge of the inner plate to provide a cushioned abutment for engagement with a support for a cooperating socket when the stud is tipped for disengagement from a socket, as and for the purpose described.

5. A fastener installation comprising, in combination, a fastener part for cooperative engagement with another fastener part, a flexible carrying medium and an attaching plate, said first mentioned fastener part having a base plate resting against one side of the carrying medium, said attaching plate resting against the opposite side of the carrying medium, means extending through the carrying medium from one of said plates and engaging the other of said plates to secure them to the carrying medium, and an abutment provided by an extended portion of said attaching plate beyond the periphery of said base plate at one side to back-support a portion of the carrying medium beyond that side of said base plate, thereby to prevent the base plate from contacting with a support to which said second mentioned fastener part is secured when said first mentioned fastener part is tipped to disengage it from said second mentioned fastener part.

6. A fastener installation comprising, in combination, a fastener part for cooperative engagement with another fastener part, a flexible carrying medium and an attaching plate, said first mentioned fastener part having a base plate resting against one side of the carrying medium, said attaching plate resting against the opposite side of the carrying medium, means extending through the carrying medium from one of said plates and engaging the other of said plates to secure them to the carrying medium, and an abutment provided by a bossed portion of an inturned flange on an extended portion of said attaching plate beyond the periphery of said base plate at one side to back-support a portion of the carrying medium beyond that side of said base plate, thereby to prevent the base plate from contacting with a support to which said second mentioned fastener part is secured when said first mentioned fastener part is tipped to disengage it from said second mentioned fastener part.

7. An attaching plate for securing a separable fastener stud element to a support, said plate having an abutment in the form of a boss at the under side of the plate adjacent to the edge and located at one side only for pressing a portion of a flexible support out of the general plane of the remainder of the flexible support.

8. An attaching plate for securing a separable fastener stud element to a support, said plate having an inturned flange at its under side and a boss portion formed from said flange for pressing a portion of the support out of its general plane and a number of attaching prongs extending from the attaching plate in the same direction as said boss portion.

9. In a fastener installation, a curtain 1, a plate 7 at the front side of the curtain, a plate 4 at the inner side of the curtain 1, a snap fastener stud portion extending from one of said plates and a bulge 13 provided in the curtain extending along the edge of the plate at one side only, said bulge being formed by the means 12 to prevent contact of the plate 4 with the fastener support 2.

10. In a fastener installation, a curtain 1, a plate 7 at the front side of the curtain, a plate 4 at the inner side of the curtain, a snap fastener stud portion extending from one of said plates, attaching prongs 9 presented by one of the plates for passage through the curtain 1 and slots 10 in the other plate to secure the plates to the curtain and notches 11 in the walls of the slots 10 for assisting in guiding the prongs 9 into the slots 10.

In testimony whereof, I have signed my name to this specification.

MOSES F. CARR.